(12) United States Patent
Ishida

(10) Patent No.: US 11,276,866 B2
(45) Date of Patent: Mar. 15, 2022

(54) CATALYST FOR SOLID POLYMER FUEL CELLS AND METHOD FOR PRODUCING THE SAME

(71) Applicant: TANAKA KIKINZOKU KOGYO K.K., Tokyo (JP)

(72) Inventor: Minoru Ishida, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 143 days.

(21) Appl. No.: 16/630,579

(22) PCT Filed: Sep. 20, 2018

(86) PCT No.: PCT/JP2018/034791
§ 371 (c)(1),
(2) Date: Jan. 13, 2020

(87) PCT Pub. No.: WO2019/065443
PCT Pub. Date: Apr. 4, 2019

(65) Prior Publication Data
US 2020/0176786 A1 Jun. 4, 2020

(30) Foreign Application Priority Data
Sep. 27, 2017 (JP) .............................. JP2017-186174

(51) Int. Cl.
*H01M 4/00* (2006.01)
*H01M 4/92* (2006.01)
*H01M 8/10* (2016.01)

(52) U.S. Cl.
CPC .... *H01M 4/926* (2013.01); *H01M 2008/1095* (2013.01)

(58) Field of Classification Search
CPC ............. H01M 4/8828; H01M 4/8882; H01M 4/8892; Y02E 60/50
See application file for complete search history.

(56) References Cited

U.S. PATENT DOCUMENTS

| 2003/0045425 A1 | 3/2003 | Ruth et al. |
| 2005/0101481 A1 | 5/2005 | Ruth et al. |

(Continued)

FOREIGN PATENT DOCUMENTS

| EP | 2 866 287 A1 | 4/2015 |
| EP | 2 958 173 A1 | 12/2015 |

(Continued)

OTHER PUBLICATIONS

International Searching Authority, "International Search Report," issued in connection with International Patent Application No. PCT/JP2018/034791, dated Nov. 20, 2018.

(Continued)

*Primary Examiner* — Cynthia H Kelly
*Assistant Examiner* — Monique M Wills
(74) *Attorney, Agent, or Firm* — Foley & Lardner LLP

(57) ABSTRACT

The present invention relates to a catalyst for a solid polymer fuel cell that includes catalyst particles supported on a carbon powder carrier, the catalyst particles containing platinum, cobalt, and manganese. In the catalyst particles of the catalyst, the component ratio of platinum, cobalt, and manganese is Pt:Co:Mn=1:0.25 to 0.28:0.07 to 0.10 in a molar ratio, the average particle size is 3.4 to 5.0 nm, and further, in the particle size distribution of the catalyst particles, the proportion of catalyst particles having a particle size of 3.0 nm or less in the entire catalyst particles is 37% or less on a particle number basis. Then, a fluorine compound having a C—F bond is supported at least on the surface of the catalyst particles. The present invention is, with respect to the above ternary alloy catalyst, an invention particularly effective in improving the durability.

20 Claims, 1 Drawing Sheet

(56) References Cited

U.S. PATENT DOCUMENTS

| | | |
|---|---|---|
| 2009/0047568 A1 | 2/2009 | Kawai et al. |
| 2011/0143254 A1* | 6/2011 | Kongkanand ....... H01M 4/8642 |
| | | 429/483 |
| 2015/0125783 A1 | 5/2015 | Ishida et al. |
| 2016/0013495 A1 | 1/2016 | Ishida et al. |
| 2016/0072133 A1* | 3/2016 | Akizuki ................. C22F 1/02 |
| | | 429/482 |

FOREIGN PATENT DOCUMENTS

| | | |
|---|---|---|
| EP | 3 179 545 A1 | 6/2017 |
| JP | 2003-024798 A | 1/2003 |
| JP | 2006-127979 A | 5/2006 |
| JP | 5152942 B1 | 2/2013 |
| JP | 5489740 B2 | 5/2014 |
| JP | 6053223 B2 | 12/2016 |
| WO | WO-2008/050895 A1 | 5/2008 |

OTHER PUBLICATIONS

International Searching Authority, "Written Opinion," issued in connection with International Patent Application No. PCT/JP2018/034791, dated Nov. 20, 2018.

Wenchao Sheng et al., "Size Influence on the Oxygen Reduction Reaction Activity and Instability of Supported Pt Nanoparticles", Journal of the Electrochemical Society, 2012, pp. B96-B103, vol. 159, No. 2, The Electrochemical Society.

Bonakdarpour et al: "Oxygen reduction activity of Pt and Pt—Mn—Co electrocatalysts sputtered on nano-structured thin film support", Electrochimica Acta, Elsevier Science Publishers, Barking, GB, vol. 53, No. 2, Oct. 11, 2007 (Oct. 11, 2007), pp. 688-694.

Extended European Search Report dated Oct. 20, 2020 for corresponding European Patent Application No. 18862466.2.

* cited by examiner

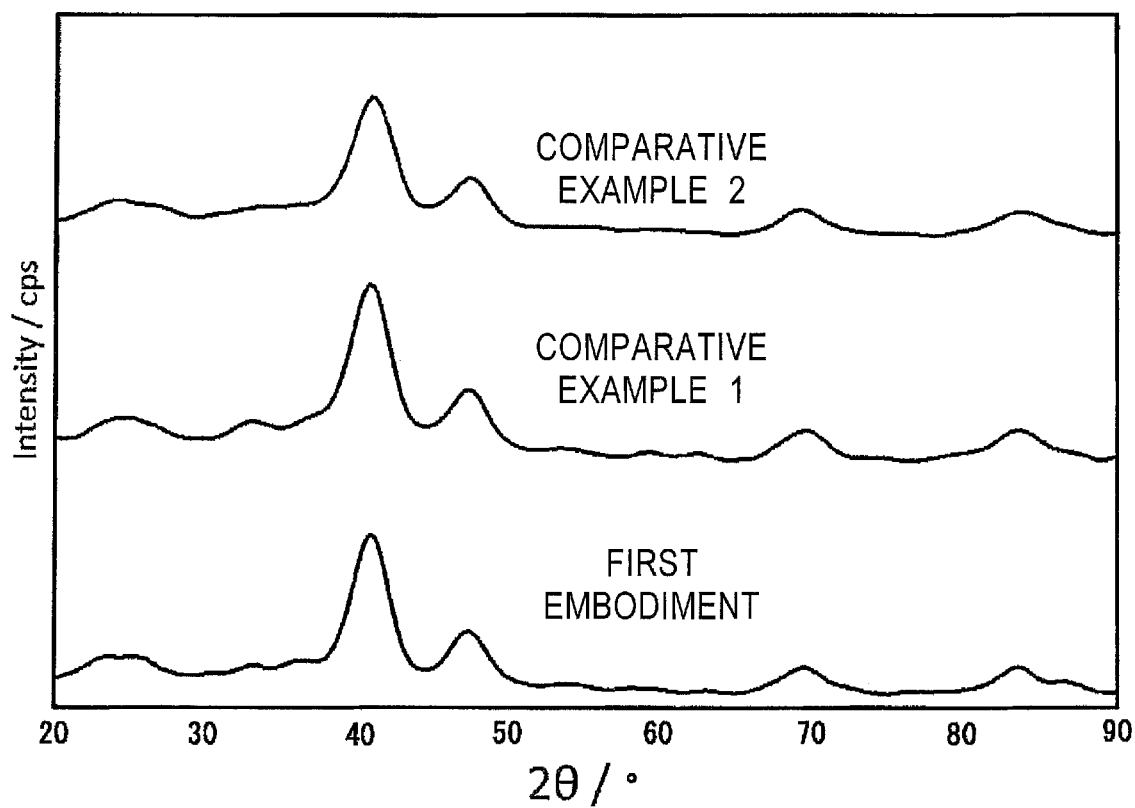

CATALYST FOR SOLID POLYMER FUEL CELLS AND METHOD FOR PRODUCING THE SAME

CROSS-REFERENCE TO RELATED APPLICATIONS

The present application claims priority under 37 U.S.C. § 371 to International Patent Application No. PCT/JP2018/034791, filed Sep. 20, 2018, which claims priority to and the benefit of Japanese Patent Application No. 2017-186174, filed on Sep. 27, 2017. The contents of these applications are hereby incorporated by reference in their entireties.

TECHNICAL FIELD

The present invention relates to a catalyst for a solid polymer fuel cell. It particularly relates to a catalyst useful for use in the cathode (air electrode) of a solid polymer fuel cell.

BACKGROUND ART

Fuel cells were once called next-generation power generation systems. In order to meet the expectations, it has become realistic to put such fuel cells in practical use, and, at present in the stage to promote their spread has been reached. There are some forms of fuel cells. Among them, solid polymer fuel cells are particularly advantageous in that they have a low operative temperature and are compact. Then, because of these merits, solid polymer fuel cells are considered promising as automotive power sources or household power sources. A solid polymer fuel cell has a laminate structure in which a solid polymer electrolyte membrane is sandwiched between a hydrogen electrode (anode) and an air electrode (cathode). Then, a hydrogen-containing fuel is supplied to the hydrogen electrode, while oxygen or air is supplied to the air electrode, and the oxidation and reduction reactions that occur at the respective electrodes is utilized to extract electricity. In addition, in each of the electrodes, a mixture of a catalyst for promoting electrochemical reactions and a solid electrolyte is generally applied.

As such a catalyst to constitute an electrode, conventionally, a catalyst having supported thereon a precious metal as a catalytic metal, particularly a platinum catalyst having supported thereon platinum, has been widely used. This is because platinum as a catalytic metal is highly active in promoting electrode reactions in both the fuel electrode and the hydrogen electrode.

The present applicant for this application has conventionally studied catalysts for a solid polymer fuel cell and provided a large number of results. For example, they have reported a ternary alloy catalyst based on the platinum catalyst described above, in which a transition metal, such as cobalt or manganese, is alloyed in addition to platinum (Patent Document 1). In addition, they have also improved this ternary alloy catalyst and also developed a catalyst additionally containing a fluorine compound (Patent Document 2).

RELATED ART DOCUMENT

Patent Documents

Patent Document 1: Japanese Patent No. 5152942
Patent Document 2: Japanese Patent No. 6053223

SUMMARY OF THE INVENTION

Problems to be Solved by the Invention

As is conventionally known, properties required for a solid polymer fuel cell include initial activity and durability. The initial activity is the most fundamental index of the performance of a catalyst, and its improvement is prerequisite. In addition, although the activity of a catalyst inevitably decreases with the passage of time (deactivation), for the practical use/spread of fuel cells, it will be indispensable to increase the time until deactivation.

The catalyst for a solid polymer fuel cell disclosed by the present applicant for this application described above is also aimed at improving both activity and durability. The ternary alloy catalyst described in Patent Document 1 is capable of ensuring catalyst activity and durability while reducing the amount of platinum used, and the catalyst is also advantageous in terms of cost. In addition, in the catalyst described in Patent Document 2, the durability has been successfully further enhanced over the catalyst described in Patent Document 1.

However, in light of the recent situation in which the popularization of fuel cells has become realistic, although demands for property improvement in catalysts are unlimited, further research is clearly necessary. Thus, the present invention provides a catalyst for a solid polymer fuel cell, particularly the ternary alloy catalyst described above, with improved durability.

Means for Solving the Problems

In order to achieve the above object, the present inventors have studied durability enhancement in conventional ternary alloy catalysts (Patent Documents 1 and 2) in terms of improvement in the production method and the like. As a result, they have found that in the conventional catalyst production step described above, when the catalytic metal supporting technique or the conditions of the subsequent heat treatment are adjusted, enhancement in catalyst activity and durability can be achieved. Although this catalyst production method will be described in detail later, the present inventors have studied the configuration of the catalyst obtained by this method. As a result, it has been confirmed that when the composition of catalyst particles is made suitable, a fluorine compound is added thereto, and also the particle size distribution of the catalyst particles is adjusted, the catalyst has suitable properties. Specifically, it has been confirmed that in the catalyst of the present invention, as compared with the conventional catalysts described above, the average particle size of catalyst particles tends to be larger, and also the proportion of catalyst particles having a small particle size is lower. The present inventors have noted this point and thus arrived at the present invention.

That is, the present invention is a catalyst for a solid polymer fuel cell that includes catalyst particles, which contains platinum, cobalt, and manganese, are supported on a carbon powder carrier. In the catalyst particles, the component ratio of platinum, cobalt, and manganese is Pt:Co:Mn=1:0.25 to 0.28:0.07 to 0.10 in a molar ratio, the catalyst particles have an average particle size of 3.4 to 5.0 nm, and further, in a particle size distribution of the catalyst particles, the proportion of catalyst particles having a particle size of 3.0 nm or less in the entire catalyst particles is 37% or less on a particle number basis; and a fluorine compound having a C—F bond is supported at least on the surface of the catalyst particles.

Hereinafter, the catalyst for a solid polymer fuel cell according to the present invention will be described in detail. In the present invention, on a carbon powder carrier, catalyst particles composed of a ternary alloy of a specific composition containing platinum, cobalt, and manganese are supported, and also a fluorine compound is supported. In addition, the catalyst particles have an average particle size within a predetermined range, and also the number of catalyst particles having a particle size of 3.0 nm or less in the particle size distribution is restricted. In the following description, these characteristics will be described first.

(i) Composition of Catalyst Particles

The reason why a Pt—Co—Mn ternary catalyst is applied to the present invention is that a platinum alloy of this composition tends to exert suitable initial activity. A platinum alloy catalyst is a conventionally known catalyst, and particularly the usefulness of a Pt—Co catalyst (binary alloy catalyst) is widely known. According to the present inventors, when manganese is added as a third metal element to a Pt—Co catalyst, presumably, the four-electron reduction function of oxygen molecules is exerted more efficiently, resulting in enhanced catalyst activity. The component ratio of platinum, cobalt, and manganese is Pt:Co:Mn=1:0.25 to 0.28:0.07 to 0.10 in a molar ratio. Although the addition of a certain amount of manganese is required, excess addition will rather reduce the activity. When the component ratio of cobalt and manganese deviates from the above range, the resulting activity will be comparable to or lower than that of a Pt—Co catalyst. Therefore, setting of the component ratio is necessary. Incidentally, the component ratio of cobalt and manganese is more preferably within a range of Pt:Co:Mn=1:0.26 to 0.27:0.08 to 0.09.

(ii) Average Particle Size and Particle Size Distribution of Catalyst Particles

As described above, in the catalyst according to the present invention, as compared with the conventional catalysts described above, the average particle size of catalyst particles tends to be larger, and also the proportion of small-size catalyst particles is small. Specifically, the average particle size is 3.4 to 5.0 nm, and, in the particle size distribution, the proportion of catalyst particles having a particle size of 3.0 nm or less in the entire catalyst particles is 37% or less. When the average particle size is less than 3.4 nm, long-time activity maintenance properties cannot be clearly obtained. In addition, when the average particle size is more than 5.0 nm, the initial activity of the catalyst cannot be sufficiently obtained. As compared with the catalysts of Patent Documents 1 and 2 described above, this average particle size range for catalyst particles lie in a coarse region.

Then, in the present invention, the proportion of small-size catalyst particles having a particle size of 3.0 nm or less is reduced. When catalyst particles having a particle size of 3.0 nm or less are 37% or less of the entire catalyst particles, the long-time activity maintenance properties are enhanced. Incidentally, the catalyst particles having a particle size of 3.0 nm or less are preferably 35% or less.

In the present invention, the average particle size of catalyst particles can be obtained, for example, based on an image available from TEM or like electron microscopic observation, by measuring the particle sizes of a plurality of catalyst particles and calculating the average. The particle sizes in an observation image can be measured not only by visual observation but also by image analysis. In addition, the particle size distribution can also be analyzed by statistically calculating the measured catalyst particle sizes. Incidentally, in relation to the measurement of the particle size distribution, it is preferable that 100 or more catalyst particles are arbitrarily selected, and their particle sizes are measured in advance.

(ii) Fluorine Compound

In the catalyst of the present invention, as in the conventional art (Patent Document 2), a fluorine compound having a C—F bond is supported on the surface of catalyst particles. The supporting of a fluorine compound is intended to enhance the durability of the catalyst.

As factors that cause a decrease in the activity of a catalyst with time, there are some possible factors, including the coarsening of catalyst particles, for example. However, the present inventors have attached importance to deterioration caused by the elution of metals that constitute the catalyst particles (platinum, cobalt, and manganese). This deterioration mechanism is the elimination of metals caused by the electrochemical dissolution of each metal mediated by water produced during a fuel cell reaction on the cathode side. As described above, the catalyst on the cathode side is exposed to an atmosphere having a high temperature, an acidic atmosphere, a high potential load, and the like, and the presence of water herein promotes the dissolution/elution of metals.

The fluorine compound supported in addition to the catalytic metal in the present invention acts as a water-repellent layer against the above water. It is known that a fluorine compound having a C—F bond, that is, high bonding strength, is highly stable and has unique properties, such as water repellency. In the present invention, a water-repellent layer composed of such a fluorine compound is formed on a catalyst. As a result, produced water is quickly discharged from the catalyst particle surface to suppress the dissolution of the catalytic metal mediated by water, thereby preventing a decrease in activity.

Then, as the fluorine compound to constitute a water-repellent layer, a fluorine resin, which is a water-repellent polymer material, a fluorine-based surfactant, or the like is possible. Examples thereof include polytetrafluoroethylene (PTFE) known as Teflon (registered trademark), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polyvinylidene fluoride (PVDF), polychlorotrifluoroethylene (PCTFE), a perfluorosulfonic acid-based polymer known as Nafion (registered trademark), and a perfluoroacrylic acid ester known as fluorinated acrylate. In addition, as a fluorine-based surfactant, a perfluorobutanesulfonic acid group (PFBS)-based surfactant is also effective.

In the present invention, the supporting amount of the fluorine compound forming a water-repellent layer is preferably 3 to 20 mass % based on the total mass of the catalyst. This is because an amount of less than 3 mass % is not effective, while when the amount is more than 20 mass %, the original function of the catalyst, that is, the promotion of an electrode reaction, cannot be exerted. The amount is more preferably 8 to 20 mass %, and still more preferably 8 to 11 mass %.

Incidentally, the water-repellent layer does not have to be formed on the entire surface of all the catalyst particles, and the formation may be partial. In addition, the water-repellent layer may be formed only on the catalyst particles, but even when the fluorine compound is supported on the carrier, the catalyst activity is not affected.

As described above, in the present invention, catalyst particles are composed of a platinum alloy of a specific composition (platinum-cobalt-manganese alloy), and a fluorine compound is bonded to the surface thereof, while the average particle size and particle size distribution of the catalyst particles are controlled; as a result, the catalyst has high durability. Here, in the present invention, in addition to these characteristics, as the catalyst configuration, preferred physical properties (surface conditions of catalyst particles, d-band center by XPS, and crystal structure by XRD) will be described.

(iii) Surface Conditions of Catalyst Particles (Catalytic Metal Surface Area)

In the present invention, regarding the surface conditions of the catalyst particles, the surface area of the catalytic metal (platinum, cobalt, and manganese) may also affect the catalyst activity. Specifically, when the catalytic metal specific surface area ($S_{COMSA}$) measured by a CO adsorption method is 130 m$^2$/g-metal or less, excellent durability is exerted, which is preferable. Here, a CO adsorption method is one of methods for measuring the specific surface area of a substance by a gas absorption method, and is an analysis method in which measurement is performed by use of CO gas as an adsorbate for detecting platinum exposed to the surface of a catalyst. Such a CO adsorption method is a relatively simple analysis method, and is yet capable of measuring the specific surface area (m$^2$/g) of the appropriately exposed catalytic metal (platinum, cobalt, and manganese). The catalytic metal specific surface area ($S_{COMSA}$) of the catalyst of the present invention tends to be lower than the catalytic metal specific surface area ($S_{COMSA}$ (catalytic metal=platinum)) of a conventional platinum catalyst, and its relative value with respect to the $S_{COMSA}$ of a platinum catalyst is 0.60 to 0.65. Incidentally, the catalytic metal specific surface area ($S_{COMSA}$) is more preferably 125 m$^2$/g-metal or less, and particularly preferably 120 m$^2$/g-metal or less. The lower limit of the catalytic metal specific surface area ($S_{COMSA}$) is preferably 20 m$^2$/g-metal.

(iv) Surface Conditions of Catalyst Particles (Proportion of 0-Valent Platinum)

According to the study by the present inventors, it has been confirmed that in a conventional alloy catalyst, on the surface of catalyst particles, 2-valent or 4-valent platinum derived from platinum oxide is contained. Presumably, platinum with such a valency is mainly derived from the production process of the catalyst. Then, the present inventors have considered that the presence of such 2-valent or 4-valent platinum affects the durability of a catalyst.

That is, in a catalyst for a solid polymer fuel cell, as described above, the dissolution of the catalytic metal in contact with water causes a decrease in activity. Here, the present inventors have considered that regarding platinum, platinum oxide preferentially dissolves. Thus, the present inventors have considered that if the proportion that 0-valent (zerovalent) platinum occupies on the catalyst particle surface is above a certain level, the initial activity and durability will be both excellent.

Then, in the present invention, they have considered that a catalyst in which the proportion of 0-valent platinum on the catalyst particle surface is 90% or more is preferable. In a conventional platinum catalyst or alloy catalyst, in platinum on the catalyst particle surface, the proportion of 2-valent or 4-valent platinum is about 20 to 30%. In the present invention, such platinum oxide is converted into atomic platinum, and the proportion of 0-valent platinum is made 90% or more, thereby adjusting the surface conditions of the catalyst particles; as a result, the catalyst has excellent durability. The proportion of 0-valent platinum on the catalyst particle surface is more preferably made 95% or more. Incidentally, the upper limit of the proportion of 0-valent platinum is 100%. Incidentally, the proportion of 0-valent platinum in the present invention is, as described below, based on the peak area ratio in X-ray photoelectron spectrometry.

As a method for measuring the proportion of 0-valent platinum on the catalyst particle surface, a method in which the catalyst is subjected to X-ray photoelectron spectrometry (XPS), and measurement is performed based on the Pt4f spectra measured from the catalyst, can be mentioned. In the case, the waveform of the obtained spectrum may be a mixed waveform of spectra derived from the 0-valent platinum, 2-valent platinum, and 4-valent platinum states, respectively. Therefore, the measured spectra are subjected to waveform separation based on the peak positions corresponding to the respective states to calculate each individual peak area, and, from their ratio, the proportion of 0-valent platinum atoms can be calculated. Incidentally, at the time of XPS analysis, the Pt4f spectra can be measured within a range of 67 eV to 87 eV. Then, in the waveform separation, the peak positions of 71.8 eV (0-valent platinum), 72.8 eV (2-valent platinum), and 74.6 eV (4-valent platinum) are set, whereby the proportion of 0-valent platinum (peak area ratio) can be obtained.

(v) d-Band Center by XPS

The reaction that proceeds in the fuel cell cathode is an oxygen reduction reaction ($O_2+4H^++4e^-\rightarrow 2H_2O$). This reaction starts with the adsorption of oxygen onto the platinum surface in catalyst particles, then passes through the transfer of protons and electrons on the surface of platinum, and is completed with the desorption of produced oxygen species ($H_2O$) from the platinum surface. Therefore, the oxygen-reducing activity of a catalyst depends on the bonding strength between platinum and oxygen in the catalyst particles.

Then, for the interpretation of the oxygen-reducing activity through platinum in catalyst particles, an index based on the d-band center theory is known. The d-band center is the energy center of the electronic density of states in the platinum valence band (5d band) relative to the Fermi level. In the past, the oxygen-reducing activity of thin-film/bulk platinum has been explained based on the d-band center theory. According to the d-band center theory, when the d-band center is high (when shifted upward relative to the Fermi level), the bond between platinum and oxygen is strengthened, and oxygen species are unlikely to desorb. Meanwhile, when the d-band center is low (when shifted downward relative to the Fermi level), the bonding properties between platinum and oxygen decrease, whereby the adsorption of oxygen itself is unlikely to occur. Like this, when the d-band center value is too high or too low, the oxygen-reducing activity decreases.

Here, according to findings of the present inventors, the application of the conventional platinum property evaluation based on the d-band center theory is limited to platinum in bulk or thin-film form. Then, there are only few examples that study the oxygen-reducing activity of catalyst particles themselves, that is, a platinum alloy in particulate form, based on the d-band center. The present inventors have studied the measurement of the electronic states of platinum in catalyst particles and the d-band center using X-ray photoelectron spectrometry (XPS).

In the course of study, they have found that the electronic density of states of a particulate platinum alloy in the valence band area is different from that of the heretofore known bulk platinum. Specifically, it has been confirmed that the spectral shape near the Fermi level (0 eV) and the overall shape are different. Thus, the present inventors have considered that original criteria can be set for the evaluation of the oxygen-reducing activity of a particulate platinum alloy.

Specifically, when the catalyst particles are subjected to X-ray photoelectron spectrometry to measure valence band spectra in a region of 0 eV or more and 30 eV or less, a d-band center calculated from the resulting Pt5d orbit-derived spectrum is preferably 4.23 eV or more and 4.30 eV or less. This is because when the d-band center is within this range, such catalyst particles tend to have excellent catalyst activity.

For the determination of the d-band center of platinum in the catalyst particles in the present invention, valence band spectra are measured by XPS, and the peak of the Pt5d orbit-derived spectrum is calculated based on the following calculation formula while eliminating the influences of the background and the like (Wenchao Sheng et al., Journal of Electrochemical Society, 159(2) B96-B103 (2012)). Incidentally, in the XPS analysis of the present invention, the Pt5d orbit-derived spectrum is observed in the region from near the Fermi level (0 eV) to near 12 eV.

$$d_{center} = \int N(\varepsilon)\varepsilon \, d\varepsilon / \int N(\varepsilon) \, d\varepsilon \quad \text{[Equation 1]}$$

($d_{center}$: d-Band center, N: Density of states, $\varepsilon$: Energy of states)

(vi) Crystal Structure Analysis by XRD

In the catalyst according to the present invention, there is a preferred mode also in terms of the structure of catalyst particles specified by X-ray diffraction analysis (XRD). Specifically, it is required that the metal elements constituting the catalyst particles (platinum, cobalt, and manganese) are each in a predetermined mode of presence. That is, although a Pt phase may partially remain, basically, the metal phase constituting the catalyst particles in the Pt—Co—Mn ternary catalyst is mainly an alloy phase formed of the metals alloyed with each other. As such an alloy phase, a Mn—Pt alloy phase ($MnPt_3$), a Co—Pt alloy phase ($CoPt_3$), or a Mn—Co alloy phase (MnCo) is possible.

Regarding the influence of each alloy phase on the catalyst activity, when a Mn—Co alloy phase is present in the catalyst particles, the initial activity significantly decreases, and the effect of manganese addition disappears. The reason therefor is not clear, but is presumably as follows. That is, the active species of the Pt—Co—Mn ternary catalyst are surmised to be a Mn—Pt alloy phase and a Co—Pt alloy phase, and when the added Mn and Co are not alloyed with Pt but form a Mn—Co alloy phase, the active species described above are hard to be formed.

Thus, in the present invention, in order to restrict the abundance of a Mn—Co alloy phase, the peak intensity of a Co—Mn alloy in the X-ray diffraction analysis of catalyst particles is specified. Specifically, it is preferable that the peak intensity ratio of a Co—Mn alloy that appears near $2\theta=27°$ is 0.25 or less based on a main peak that appears near $2\theta=40°$. This peak ratio may be also 0, which is rather more preferable.

The reason why the X-ray diffraction analysis results are used in order to specify the abundance of a Mn—Co alloy phase is that the X-ray diffraction analysis is a relatively simple analysis method, and yet can accurately measure the state of catalyst particles and also has quantitativity when the base peak is suitably set. As described above, in the present invention, a main peak that appears at $2\theta=40°$ to $41°$ (composite peak of Pt, $MnPt_3$, and $CoPt_3$) is used as the base peak, and the peak near $2\theta=27°$ is applied as the peak of a Mn—Co alloy phase. Incidentally, the peak of a Mn—Co alloy phase may also appear near 76°, near 52°, near 43°, and near 33°. However, the peak near $2\theta=27°$ has high sensitivity to the presence of a Mn—Co alloy phase, and thus this peak is applied.

In addition, regarding the distribution of alloy phases that constitute the catalyst particles, as described above, one in which a Mn—Pt alloy phase ($MnPt_3$) and a Co—Pt alloy phase ($CoPt_3$) are formed to compensate for the reduction of a Mn—Co alloy phase is preferable. These alloy phases have a four-electron reduction action on oxygen molecules and contribute to activity enhancement. In X-ray diffraction analysis, these alloy phases each appear near $2\theta=24°$, $32°$, and $41°$. However, it is preferable to determine based on the peak that appears near $2\theta=32°$. The peak derived from these two alloy phases is a composite of the peak of a Mn—Pt alloy phase and the Co—Pt alloy phase peak, and is difficult to separate. Thus, as the confirmation of the formation of these alloy phases, this composite peak intensity is preferably used for determination. Then, as a preferred peak intensity, the peak intensity that appears near $2\theta=32°$ is preferably 0.20 or more based on the main peak that appears at $2\theta=40°$ to $41°$.

In addition, in the catalyst according to the present invention, with the performance of the solid polymer fuel cell as an electrode considered, the supporting density of the catalyst particles is preferably 30 to 70%. The supporting density herein refers to the ratio of the mass of the catalyst particles supported on the carrier (the total mass of platinum, cobalt and manganese) to the total mass of the catalyst.

Next, the method for producing a catalyst for a solid polymer fuel cell according to the present invention will be described. In the production of the catalyst of the present invention, the basic steps follow the ordinary alloy catalyst production method, in which metals serving as catalyst particles are supported on a carrier, suitably dried, and then heat-treated to alloy the supported metals. However, as stated in the related arts described above (Patent Documents 1 and 2), in a ternary alloy catalyst containing an alloy of platinum, cobalt, and manganese as catalyst particles, it is required that in the catalytic metal supporting step, first, a catalyst having supported thereon platinum only is prepared, and cobalt and manganese are supported on the catalyst.

In addition, the catalyst according to the present invention is characterized in that the average particle size tends to be larger as compared with conventional catalysts, and, in addition, the proportion of catalyst particles having a small particle size is lower. In order for this characteristic to be developed, the alloying heat treatment temperature after supporting platinum, cobalt, and manganese on a carrier is necessary to be set on a higher-temperature side than in a conventional method.

That is, the method for producing a catalyst for a solid polymer fuel cell according to the present invention includes the steps of supporting cobalt and manganese on a platinum catalyst including platinum particles supported on a carbon powder carrier; heat-treating the platinum catalyst having cobalt and manganese supported thereon in the supporting step at 1,000 to 1,100° C.; and bringing the catalyst after the heat treatment step into contact with a solution containing a fluorine compound, and forming a water-repellent layer made of the fluorine compound on the catalyst.

Hereinafter, the catalyst production method will be described. As described above, in the present invention, a platinum catalyst is prepared, and cobalt and manganese are supported on the catalyst. A platinum catalyst can usually be produced by bringing a platinum compound solution into contact with a carrier, followed by a reduction treatment to form platinum particles. Here, as a preferred technique for developing the configuration of the catalyst according to the present invention, when a platinum compound solution is brought into contact with a carrier, the platinum compound solution and a carbon powder are preferably mixed while grinding. When a carrier is brought into contact with a platinum compound solution while grinding, the dispersion state of platinum ions is made suitable, and the surface conditions of catalyst particles are adjusted, giving the foundation of a heat treatment for alloying.

When the mixed solution of a platinum compound solution and a carrier is subjected to a reduction treatment, platinum can be precipitated to give a platinum catalyst. In the reduction treatment, a reducing agent is preferably applied. As a reducing agent, an alcohol (methanol, ethanol, etc.) is preferable. A so-called denatured alcohol obtained by mixing ethanol with a small amount of methanol can be also used. It is preferable that the reducing agent is added in an amount of 4 mol or more and 280 mol or less per mol of platinum in the mixed solution, and is added at a concentration adjusted to be 1 vol % or more and 60 vol % or less relative to the mixed solution. As conditions for reflux (reduction) after the addition of a reducing agent, it is preferable that the temperature of the mixed solution is 60° C. or more and the boiling point or less, and the reducing time is 3 hours or more and 6 hours or less. As a result of the reduction treatment, platinum particles are supported on the carrier. The platinum catalyst is recovered from the solution after the reduction treatment and may be suitably subjected to a drying treatment.

For supporting cobalt and manganese on the platinum catalyst produced as above, a common method can be applied. Metal salt solutions of cobalt and manganese are brought into contact with a platinum catalyst, followed by a reduction treatment, whereby metallic cobalt and manganese are precipitated in the vicinity of platinum particles. As a metal salt solution of cobalt, cobalt chloride hexahydrate, cobalt nitrate, cobalt acetate tetrahydrate, or the like may be used, while as a metal salt solution of manganese, manganese chloride tetrahydrate, manganese nitrate hexahydrate, manganese acetate tetrahydrate, or the like may be used. The order of contact of metal salt solutions with the platinum catalyst at this time is not particularly limited. One of the metal salt solutions may be brought into contact first, or a mixture of the metal salt solutions of cobalt and manganese may be brought into contact with the platinum catalyst.

Incidentally, regarding the supporting amounts of cobalt and manganese, the concentration and amount of each metal salt solution may be set such that the resulting ratio is within the above cobalt/manganese component ratio range with the supporting amount of the platinum catalyst considered. However, when the treatment with an oxidizing solution described below is performed, the supporting amounts of cobalt and manganese may be increased from the set component ratio by about 1.5 to 5 times for cobalt and 1.5 to 3 times for manganese, respectively.

After cobalt and manganese are supported on the platinum catalyst, drying is performed as necessary, and then a heat treatment is performed to alloy the metals. In the present invention, the alloying heat treatment temperature is 1,000 to 1,100° C. In the conventional arts (Patent Documents 1 and 2) described above, the heat treatment temperature for alloying is set at 700° C. or more. As a heat treatment temperature for alloying platinum, cobalt, and manganese or for forming a Mn—Pt alloy phase and a Co—Pt alloy phase as active species, 700° C. or more has been satisfactory, and generally, the heat treatment has been often performed at about 900° C.

In contrast, in the present invention, the average particle size tends to be larger (3.4 to 5.0 nm) as compared with conventional catalysts, and further it is necessary to reduce the proportion to small-size (3 nm or less) catalyst particles in the entire catalyst particles. For the development of this configuration, a high-temperature heat treatment at 1,000° C. or more is indispensable. However, a heat treatment temperature that is extremely high is undesirable in terms of excessive coarsening of catalyst particles and also of facilities. Thus, the heat treatment temperature in the invention is limited to a narrow temperature range on a high-temperature side, that is, 1,000° C. or more and 1,100° C. or less. Incidentally, the heat treatment is preferably performed in a non-oxidizing atmosphere, particularly preferably in a reducing atmosphere (hydrogen gas atmosphere, etc.).

After the formation of alloyed catalyst particles by the heat treatment, a water-repellent layer is formed on the catalyst particle surface. In this water-repellent treatment, the ternary catalyst produced above is immersed in a fluorine compound solution, and the solvent in the fluorine compound solution is volatilized or evaporated away, whereby the fluorine compound is supported on the catalyst. Here, the fluorine compound solution is obtained by dissolving a fluorine compound in a solvent capable of dissolving the above fluorine compound, and the solvent may be a fluorine solvent or a non-fluorine solvent. At this time, the amounts of solvent and fluorine compound are adjusted so that the fluorine content of the fluorine compound solution will be equal to the amount of fluorine to be supported on the catalyst.

In the immersion treatment for supporting a fluorine compound, it is preferable that the immersion time is 1 to 48 hours, and the treatment is performed with stirring. The temperature of the fluorine compound solution is 30 to 150° C., but is selected according to the kind of solvent. Then, after immersion, the fluorine compound solution having dispersed therein the catalyst is warmed in a dryer or the like and maintained until the solvent completely disappears.

Through the above treatment, the catalyst according to the present invention can be produced. Incidentally, in the above production step, after the alloying heat treatment, the catalyst before supporting a fluorine compound is brought into contact with an oxidizing solution at least once. For the catalyst particles of the catalyst according to the present invention, the ratio between cobalt and manganese is important, but it is sometimes difficult to adjust the ratio only in their supporting step. Thus, it is possible that in the step of supporting cobalt and manganese, they are supported in larger amounts than intended, and a treatment with an oxidizing solution is performed to elute cobalt and manganese, thereby adjusting the supporting amounts.

As the oxidizing solution used in this treatment step, a solution of sulfuric acid, nitric acid, phosphorous acid, potassium permanganate, hydrogen peroxide, hydrochloric acid, chloric acid, hypochlorous acid, chromic acid, or the like is preferable. The concentration of the oxidizing solution is preferably 0.1 to 1 mol/L, and the catalyst is preferably immersed in the solution. As the conditions for the oxidizing solution treatment, the contact time is preferably 1 to 10 hours, and the treatment temperature is preferably 40 to 90° C. Incidentally, the oxidizing solution treatment is not limited to the case where the catalyst is brought into contact with the oxidizing solution once, and the treatment may be repeatedly performed several times. In addition, when the acid treatment is performed several times, the kind of solution may be changed for every treatment.

Advantageous Effects of the Invention

As described above, the catalyst of the present invention has excellent initial activity and improved durability over a conventional catalyst including catalyst particles composed of a ternary alloy and a water-repellent layer.

BRIEF DESCRIPTION OF DRAWINGS

The FIGURE illustrates an X-ray diffraction pattern of each of the catalysts of the present embodiment and Comparative Examples 1 and 2.

DESCRIPTION OF EMBODIMENTS

Hereinafter, preferred embodiments of the present invention will be described.

First Embodiment: In this embodiment, a platinum catalyst was produced. Cobalt and manganese were supported on the platinum catalyst and alloyed, and then treated with a fluorine compound to produce a ternary catalyst.

[Production of Platinum Catalyst]

603.83 mL of a dinitrodiammine platinum nitric acid solution (platinum content: 30.30 g) and 3,793 mL of pure water were placed in a production vessel. Then, 70.00 g of a fine carbon powder (specific surface area: 800 m²/g, trade name: KB) serving a carrier was added with grinding. Subsequently, as a reducing agent, 540 mL (10.8 vol %) of denatured alcohol (95% ethanol+5% methanol) was added and mixed. The mixed solution was subjected to a reflux reaction at about 95° C. for 6 hours to reduce platinum, followed by filtration, drying (60° C., 15 hours), and washing. Through the above steps, a platinum catalyst was obtained (platinum supporting: 30 wt %).

[Supporting of Cobalt and Manganese]

Cobalt and manganese were supported on the platinum catalyst produced above. The platinum catalyst was immersed in a metal salt solution prepared by dissolving cobalt chloride ($CoCl_2 \cdot 6H_2O$) and manganese chloride ($MnCl_2 \cdot 4H_2O$) in 100 mL of ion exchange water, and stirred with a magnetic stirrer. Then, 500 mL of a sodium borohydride (SBH) solution having a concentration of 1 mass % was added dropwise to this solution to perform a reduction treatment, thereby supporting cobalt and manganese on the platinum catalyst, followed by filtration, washing, and drying.

[Alloying Heat Treatment]

The catalyst having supported thereon the catalytic metal was heat-treated for alloying. In this embodiment, the heat treatment was performed in 100% hydrogen gas for 30 minutes at a heat treatment temperature of 1,000° C.

[Treatment with Oxidizing Solution]

The catalyst after the alloying heat treatment was subjected to an oxidizing solution treatment. In this treatment, the heat-treated catalyst was treated in a 0.2 mol/L aqueous sulfuric acid solution at 80° C. for 2 hours, followed by filtration, washing, and drying. Then, the catalyst was treated in a 1.0 mol/L aqueous nitric acid solution (dissolved oxygen amount: 0.01 cm³/cm³ (in terms of STP)) at 70° C. for 2 hours, followed by filtration, washing, and drying.

[Formation of Water-Repellent Layer]

Then, the produced Pt—Co—Mn ternary catalyst was treated with a fluorine compound solution to form a water-repellent layer. As the fluorine compound solution, 20 mL of a commercially available fluorine resin material (trade name: EGC-1700, manufactured by Sumitomo 3M Limited, fluorine resin content: 1 to 3%) was dissolved in 30 mL of hydrofluoroether (trade name: Novec 7100, manufactured by Sumitomo 3M Limited) as a diluent solvent and used. In this treatment, 5 g of the catalyst was immersed in the above fluorine compound solution, stirred at room temperature for 3 hours, and further stirred at 60° C. for 5 hours. Subsequently, the mixture was maintained at 60° C. in a dryer to cause evaporation until the solvent completely disappeared. As a result of this treatment, a catalyst having a fluorine compound supported thereon and including a water-repellent layer was produced.

Comparative Example 1: The same catalyst as the Pt—Co—Mn ternary catalyst described in Patent Document 1 was produced. In this embodiment, a commercially available platinum catalyst was prepared, and cobalt and manganese were supported in the same manner as in the first embodiment. Then, a heat treatment was performed at a treatment temperature of 900° C. for 30 minutes to produce a Pt—Co—Mn ternary catalyst.

Comparative Example 2: The same catalyst as the Pt—Co—Mn ternary catalyst having a water-repellent layer described in Patent Document 2 was produced. The catalyst produced in Comparative Example 1 was prepared, and, in the same manner as in the first embodiment, the catalyst was treated with a fluorine compound solution to form a water-repellent layer.

Various physical properties of the catalysts of the present embodiment and Comparative Examples 1 and 2 above were evaluated. First, the produced catalysts were subjected to composition analysis to measure the component ratio of platinum, cobalt, and manganese in the catalyst particles. The composition analysis was performed by ICP (high-frequency inductively coupled plasma atomic emission spectrometry). In this analysis by ICP, 20 mg of a catalyst was weighed, calcined, and reduced, and then about 5 ml of aqua regia was added thereto to dissolve the catalyst into a solution. The solution was then diluted about 20-fold and subjected to the analysis.

Next, the average particle size and particle size distribution of catalyst particles of each catalyst were measured. Here, the particle sizes of 300 or more catalyst particles were measured by TEM observation to calculate the particle size distribution. Specifically, each sample was introduced into a TEM device (TEM-STEM device: manufactured by JEOL, JEM-2100F, observation conditions: acceleration voltage: of 200 kV, magnification: ×2500000). Visual fields with sufficient dispersibility were selected, and a plurality of visual fields was photographed in the STEM mode at a constant magnification. Based on the obtained STEM image, the particle size distribution was measured by use of a particle analysis software. At this time, the particle size was determined as a pixel number equivalent-circle diameter. Then, the particle sizes of all the catalyst particles measured were summed up, and the average particle size ($D_{50}$) was calculated from the number of measured particles. In addition, from the number of catalyst particles having a particle size of 3 nm or less, their proportion was also calculated.

In addition, the metal specific surface area ($S_{COMSA}$) of each catalyst was measured by a CO adsorption method. The metal specific surface area defined herein is a value obtained by calculating a surface area from the CO adsorption amount measured based on the prescribed CO pulse adsorption method, and converting the surface area into a value per gram of metal.

In the measurement of the metal specific surface area ($S_{COMSA}$), a metal dispersity measuring device (BEL-METAL-3, manufactured by BEL Japan Inc.) was used. 40.0 mg of a sample was weighed precisely to 0.1 mg and placed in a glass cell. The cell was attached to the measuring device, and automatic measurement was started. As a pretreatment, in a flow of a He gas (50 mL/min), the temperature was raised from room temperature to 100° C. over 20 minutes and maintained for 15 minutes. Subsequently, the gas was changed to $H_2$ (50 mL/min), and the temperature was maintained at 100° C. for 30 minutes. The gas was then changed to He (50 mL/min), and the temperature was lowered from 100° C. to 30° C., then raised to 40° C., and maintained at 40° C. After the completion of this pretreatment, the amount of CO gas adsorption was measured by the CO pulse adsorption method. From the amount of CO gas adsorption obtained, $S_{COMSA}$ was determined from the following formula.

$$S_{COMSA} \, (m^2/g) = (26.88 \times B \times \sigma)/(A \times \text{metal content ratio (supporting)}) \quad [\text{Equation 2}]$$

A: Weight of the sample (catalyst) placed in the glass cell (g)

B: Amount of CO adsorption (mL)

σ: Adsorption gas molecular cross-sectional area ($nm^2$/number) (when CO is adopted, 0.163 $nm^2$/number)

In addition, the catalysts of the first embodiment and Comparative Examples 1 and 2 were subjected to XPS analysis, and the surface platinum state (the proportion of 0-valent platinum) and the d-band center value were evaluated. In the XPS analysis, Quantera SXM manufactured by ULVAC-PHI was used as the analyzer, and the analysis conditions were as follows: X-ray source: monochromatic Al—Kα ray, voltage: 15 kV, output: 25.1 W, beam diameter: 200 μmφ. In this analysis, the energy of generated photoelectrons was detected, and the wide-range photoelectron spectra (wide spectra) were acquired.

Then, with respect to the Pt4f spectra obtained by XPS, in order to calculate the proportion of 0-valent metal platinum, data analysis was performed by use of a software (MultiPak V8.2C) manufactured by ULVAC-PHI, Inc. In this analysis, as "Pt", three chemical states (0-valent Pt (0), 2-valent Pt (II), 4-valent Pt (IV)) were assumed. Then, the main peak positions of the respective states were set as 0-valent Pt (0): 71.7 eV, 2-valent Pt (II): 72.7 eV, and 4-valent Pt (IV): 74.4 eV, and the Pt4f spectra measured by the software were subjected to peak separation. After the peak separation, from the area ratio of the peak of each state, the ratio was calculated.

In addition, for the analysis of d-band center values, the valence band spectra were measured by XPS analysis, and, with respect to the peak of the Pt5d orbit-derived spectrum, the background, C- and F-derived components, and the like are subtracted, thereby extracting the d-band. An energy value was then determined from the above calculation formula of Equation 1, and such a value was used in the analysis.

Further, the configuration of the catalyst particles in each catalyst was studied by X-ray diffraction analysis. As the X-ray diffractometer, an X-ray diffractometer JDX-8030 manufactured by JEOL was used. The sample was formed into a fine powder and placed in a glass cell, and analyzed by use of Cu (kα ray) as an X-ray source under the following conditions: tube voltage: 40 kV, tube current: 30 mA, scan rate: 7°/min up to 2θ=20 to 90°, step angle: 0.1°. In XPS, Al kα ray was applied as the X-ray source, and the analysis was performed under the following conditions: voltage: 15 kV, current: 1.66 mA, beam diameter: 100 μm, measurement range: 250 $\mu m^2$.

The FIGURE shows the X-ray diffraction pattern of each of the catalysts of the present embodiment and Comparative Examples 1 and 2. From the FIGURE, the main peak that appears near 2θ=40° observed in all the catalysts is a composite peak of metals Pt, $MnPt_3$, and $CoPt_3$. Then, presumably, the peak observed near 2θ=27° is derived from a Co—Mn alloy. Further, the peak near 2θ=32° (32 to 34°) is a composite peak of $MnPt_3$ and $CoPt_3$. Based on the FIGURE, regarding each catalyst, the ratio between the peak of the Co—Mn alloy and the main peak and the ratio between the composite peak of $MnPt_3$ and $CoPt_3$ and the main peak were measured.

Table 1 shows the composition, configuration (average particle size and particle size distribution), and $S_{COMSA}$ measurement results of the catalyst particles of the present embodiment and Comparative Examples 1 and 2 obtained above. In addition, Table 2 shows the proportion of 0-valent metal platinum in platinum on the catalyst particle surface and the d-band center value obtained from the XPS analysis, and also the peak ratio obtained from XRD. In these tables, the analysis/measurement results of a platinum catalyst are also shown.

TABLE 1

| | Catalyst particle composition (molar ratio) | | | F (wt %) | Catalyst particle configuration | | $S_{OOMSA}$ ($m^2$/g-metal) |
| | | | | | Average particle size (nm) | Proportion of small-size particles (%) | |
| --- | --- | --- | --- | --- | --- | --- | --- |
| | Pt | Co | Mn | | | | |
| First Embodiment | 1 | 0.26 | 0.08 | 9.7 | 3.7 | 29 | 120 |
| Comparative Example 1 | 1 | 0.19 | 0.05 | — | 3.3 | 40 | 135 |
| Comparative Example 2 | 1 | 0.22 | 0.06 | 9.1 | 3.2 | 44 | 143 |
| Platinum catalyst | 1 | — | — | — | — | — | 200 |

TABLE 2

| | Catalyst particle composition (molar ratio) | | | F (wt %) | Surface Pt state ratio (%) | | | d-Band center (eV) | XRD | |
|---|---|---|---|---|---|---|---|---|---|---|
| | | | | | Pt ($Pt^0$) | $PtO_2$ ($Pt^{2+}$) | $PtO_2$, Pt$(OH)_4$ ($Pt^{4+}$) | | Peak ratio (CoMn) | Peak ratio (MnPt3 + CoPt3) |
| | Pt | Co | Mn | | | | | | | |
| First Embodiment | 1 | 0.26 | 0.08 | 9.7 | 90 | 6 | 4 | 4.25 | 0.21 | 0.23 |
| Comparative Example 1 | 1 | 0.19 | 0.05 | — | 94 | 4 | 2 | 4.28 | 0.26 | 0.29 |
| Comparative Example 2 | 1 | 0.22 | 0.06 | 9.1 | 94 | 4 | 2 | 4.24 | 0.27 | 0.27 |
| Platinum catalyst | 1 | — | — | — | 54 | 37 | 9 | 4.47 | — | — |

[Initial Activity Test]

The Pt—Co catalysts of the example, comparative examples, and reference example were each subjected to an initial activity test. This performance test was performed by measuring the Mass Activity. In the experiment, a single cell was used. A membrane/electrode assembly (MEA) made of a proton-conducting polymer electrolyte membrane sandwiched between cathode and anode electrodes each having an electrode area of 5 cm×5 cm=25 cm² was produced and evaluated (set utilization efficiency: 40%). As a pretreatment, a current/voltage curve was drawn under the following conditions: hydrogen flow rate: 1,000 mL/min, oxygen flow rate: 1,000 mL/min, cell temperature: 80° C., anode humidification temperature: 90° C., cathode humidification temperature: 30° C. Subsequently, as the main measurement, the Mass Activity was measured. The test method was as follows. The current value (A) at 0.9 V was measured, and, from the weight of Pt applied onto the electrodes, the current value per gram of Pt (A/g-Pt) was determined to calculate the Mass Activity.

[Endurance Test]

Further, in order to evaluate the durability of each catalyst, an endurance test (deterioration test) was performed. In the endurance test, membrane/electrode assemblies (MEA) after the above initial activity test were subjected to an electric potential cycle test. In the electric potential cycle test, sweeping was performed between 650 to 1,050 mV at a sweep rate of 40 mV/s for 20 hours (3,600 cycles) as a pretreatment, and then sweeping was performed between 650 to 1,050 mV at a sweep rate of 100 mV/s (main treatment) for 24 hours (first time: 44 hours in total, 14,400 cycles) and then for 24 hours (second time: 68 hours in total, 25,200 cycles) to deteriorate the catalyst. Then, the Mass Activity of the catalyst that had deteriorated through the cycles of the second time was measured in the same manner as above.

Table 3 shows the results of the above initial activity test and endurance test.

TABLE 3

| | Mass Activity (A/g-Pt) | | | |
|---|---|---|---|---|
| | Measured value | | Relative evaluation *[1] | |
| | Initial | After endurance | Initial | After endurance |
| First Embodiment | 69 | 59 | 2.2 | 1.8 |
| Comparative Example 1 | 81 | 24 | 2.5 | 0.8 |
| Comparative Example 2 | 90 | 49 | 2.8 | 1.5 |
| Platinum catalyst | 32 | 28 | 1.0 | 0.9 |

*[1] A relative value taking the initial activity of the platinum catalyst as 1.0.

It is noted from Table 3 that the catalyst of the present embodiment is slightly inferior to Comparative Examples 1 and 2 in terms of the initial activity, however the drop after the endurance test (after deterioration) is only about 15%. In addition, when evaluated based on the relative value with respect to a platinum catalyst, it can be said that the initial activity initial activity of the catalyst according to the present embodiment is also extremely high. In Comparative Example 1, although the initial activity is excellent, the activity after duration is inferior to that of a platinum catalyst. In addition, in Comparative Example 2, although some improvement in durability can be seen, with reference to the results of the first embodiment, it must be said that there still is room for improvement.

As compared with Comparative Examples 1 and 2, in the catalyst according to the present embodiment, the average particle size is larger, and further the proportion of small-size particles of 3.0 nm or less is lower. Then, in comparison with the initial activity of a platinum catalyst, the catalyst of the present embodiment does not look too bad against Comparative Examples 1 and 2. That is, it can be seen that when the standpoint of durability is considered, the catalyst of the present embodiment is a highly practical catalyst.

Second Embodiment: Here, the treatment conditions for the formation of a water-repellent layer by use of a fluorine compound solution were changed from the catalyst production steps of the first embodiment, and catalysts were thus produced. A ternary catalyst was produced under the same conditions as in the first embodiment, and the amount of fluorine resin in the fluorine compound solution was adjusted to produce a plurality of catalysts. Specifically, in 30 mL of a diluting solvent (trade name: Novec 7100, manufactured by Sumitomo 3M Limited), a fluorine compound solution prepared by dissolving a fluorine resin material (trade name: EGC-1700, manufactured by Sumitomo 3M Limited) in an amount of 2 mL (Example 1), 10 mL (Example 2), 20 mL (Example 3: first embodiment), or 40 mL (Example 4) was used to treat 5 g of a catalyst. Subsequently, the catalytic performance of each catalyst was studied in the same manner as in the first embodiment. The results are shown in Table 4.

TABLE 4

| | Catalyst particle composition (molar ratio) | | | Catalyst particle configuration | | Mass Activity (A/g-Pt) | | | |
|---|---|---|---|---|---|---|---|---|---|
| | | | | Average particle | Proportion of small-size | Measured value | | Relative evaluation *1 | |
| | | | F | size | particles | | After | | After |
| | Pt | Co | Mn | (wt %) | (nm) | (%) | Initial | endurance | Initial | endurance |
| Example 1 | 1 | 0.27 | 0.09 | 6.8 | 3.8 | 29 | 93 | 46 | 2.9 | 1.4 |
| Example 2 | 1 | 0.26 | 0.09 | 7.5 | 3.6 | 30 | 79 | 41 | 2.5 | 1.3 |
| Example 3 | 1 | 0.26 | 0.08 | 9.7 | 3.7 | 29 | 69 | 59 | 2.2 | 1.8 |
| Example 4 | 1 | 0.27 | 0.08 | 12.2 | 3.9 | 28 | 63 | 47 | 2.0 | 1.5 |
| Platinum catalyst | 1 | — | — | — | — | — | 32 | 28 | 1.0 | 0.9 |

*1 A relative value taking the initial activity of the platinum catalyst as 1.0.

In the catalyst of each example, while the composition of catalyst particles and the amount of fluorine compound are within appropriate ranges, the average particle size of catalyst particles and the proportion of small-size particles are also within suitable ranges. As a result, it can be seen that they have improved initial activity and durability over a platinum catalyst. Incidentally, the catalyst particularly excellent in terms of durability was Example 3.

INDUSTRIAL APPLICABILITY

The present invention, as an electrode catalyst of a solid polymer fuel cell, is capable of maintaining excellent initial activity and achieving improvement in durability. The present invention contributes to the spread of fuel cells, and eventually forms the basis for the solution to environmental problems.

The invention claimed is:

1. A catalyst for a solid polymer fuel cell, comprising catalyst particles supported on a carbon powder carrier, the catalyst particles comprise a catalytic metal containing platinum, cobalt, and manganese, wherein
the catalyst particles have a component ratio of platinum, cobalt, and manganese as Pt:Co:Mn=1:0.25 to 0.28: 0.07 to 0.10 in a molar ratio,
the catalyst particles have an average particle size of 3.4 to 5.0 nm, and further, in a particle size distribution of the catalyst particles, a proportion of catalyst particles having a particle size of 3.0 nm or less in entire catalyst particles is 37% or less on a particle number basis, and
a surface of the catalyst particles supports a water-repellent layer made of a fluorine compound having a C—F bond.

2. The catalyst for a solid polymer fuel cell according to claim 1, wherein the fluorine compound constitutes 3 to 20 mass % on a total mass of the catalyst.

3. The catalyst for a solid polymer fuel cell according to claim 1, wherein the fluorine compound is a fluorine resin or a fluorine-based surfactant.

4. The catalyst for a solid polymer fuel cell according to claim 1, wherein a specific surface area of the catalytic metal ($S_{COMSA}$) per g of the catalytic metal measured by a CO adsorption method is 130 m$^2$/g-metal or less.

5. The catalyst for a solid polymer fuel cell according to claim 1, wherein a proportion of 0-valent Pt in Pt present on a catalyst particle surface is 90% or more and 100% or less.

6. The catalyst for a solid polymer fuel cell according to claim 1, wherein when the catalyst particles are subjected to X-ray photoelectron spectrometry to measure valence band spectra in a region of 0 ev or more and 30 ev or less, a d-band center value calculated from a resulting Pt5d orbit-derived spectrum is 4.23 eV or more and 4.30 V or less.

7. The catalyst for a solid polymer fuel cell according to claim 1, wherein when the catalyst particles are subjected to X-ray diffraction analysis, a peak intensity ratio of a Co—Mn alloy that appears near 2θ=27° is 0.25 or less based on a main peak that appears near 2θ=40°.

8. The catalyst for a solid polymer fuel cell according to claim 1, wherein when the catalyst particles are subjected to X-ray diffraction analysis, a ratio of a peak of a CoPt$_3$ alloy and a peak of a MnPt$_3$ alloy that appear near 2θ=32° is 0.20 or more based on a main peak that appears near 2θ=40°.

9. The catalyst for a solid polymer fuel cell according to claim 1, wherein a supporting density of the catalyst particles is 30 to 70%.

10. A method for producing a catalyst for a solid polymer fuel cell according to claim 1, comprising the steps of:
supporting cobalt and manganese on a platinum catalyst including platinum particles supported on a carbon powder carrier;
heat-treating the platinum catalyst having cobalt and manganese supported thereon in the supporting step at 1,000 to 1,100° C.; and
bringing the catalyst after the heat treatment step into contact with a solution containing a fluorine compound and forming a water-repellent layer made of the fluorine compound on surface of the catalyst.

11. The method for producing a catalyst for a solid polymer fuel cell according to claim 10, comprising
a step of producing the platinum catalyst, comprising
producing a mixed solution by mixing a carbon powder carrier and a platinum compound solution, and adding a reducing agent to the mixed solution to support catalyst particles containing platinum on the carbon powder carrier, and
the step of producing a mixed solution includes mixing the platinum compound solution while grinding the carbon powder carrier.

12. The method for producing a catalyst for a solid polymer fuel cell according to claim 10, comprising a step of bringing the heat-treated catalyst into contact with an oxidizing solution at least once to elute cobalt and manganese on the catalyst particle surface.

13. The method for producing a catalyst for a solid polymer fuel cell according to claim 12, wherein the oxidizing solution is sulfuric acid, nitric acid, phosphorous acid, potassium permanganate, hydrogen peroxide, hydrochloric acid, chloric acid, hypochlorous acid, or chromic acid.

14. The catalyst for a solid polymer fuel cell according to claim 2, wherein the fluorine compound is a fluorine resin or a fluorine-based surfactant.

15. The catalyst for a solid polymer fuel cell according to claim 2, wherein a specific surface area of the catalyst metal ($S_{COMSA}$) per g of the catalytic metal measured by a CO adsorption method is 130 m$^2$/g-metal or less.

16. The catalyst for a solid polymer fuel cell according to claim 4, wherein a proportion of 0-valent Pt in Pt present on a catalyst particle surface is 90% or more and 100% or less.

17. The catalyst for a solid polymer fuel cell according to claim 5, wherein when the catalyst particles are subjected to X-ray photoelectron spectrometry to measure valence band spectra in a region of 0 ev or more and 30 ev or less, a d-band center value calculated from a resulting Pt5d orbit-derived spectrum is 4.23 eV or more and 4.30 V or less.

18. The catalyst for a solid polymer fuel cell according to claim 6, wherein when the catalyst particles are subjected to X-ray diffraction analysis, a peak intensity ratio of a Co—Mn alloy that appears near 2θ=27° is 0.25 or less based on a main peak that appears near 2θ=40°.

19. The catalyst for a solid polymer fuel cell according to claim 7, wherein when the catalyst particles are subjected to X-ray diffraction analysis, a ratio of a peak of a CoPt$_3$ alloy and a peak of a MnPt$_3$ alloy that appear near 2θ=32° is 0.20 or more based on a main peak that appears near 2θ=40°.

20. The catalyst for a solid polymer fuel cell according to claim 8, wherein a supporting density of the catalyst particles is 30 to 70%.

\* \* \* \* \*